(12) United States Patent
Greiss (10) Patent No.: US 6,590,930 B1
(45) Date of Patent: Jul. 8, 2003

(54) LOCAL AREA NETWORK DIAGNOSIS

(75) Inventor: Israel Greiss, Raanana (IL)

(73) Assignee: Mysticom Ltd., Netanya (IR)

( * ) Notice: Subject to any disclaimer, the term of this patent is extended or adjusted under 35 U.S.C. 154(b) by 0 days.

(21) Appl. No.: 09/359,254

(22) Filed: Jul. 22, 1999

(51) Int. Cl.$^7$ .............................................. H04B 17/00
(52) U.S. Cl. ........................ 375/224; 375/257; 375/229
(58) Field of Search ................................ 375/224, 229, 375/233, 257; 324/617, 644; 379/400

(56) References Cited

U.S. PATENT DOCUMENTS 5,818,378 A * 10/1998 Cheng et al. ............... 341/155
6,421,381 B1 * 7/2002 Raghavan ................... 375/233
6,438,163 B1 * 8/2002 Raghavan et al. .......... 375/233

OTHER PUBLICATIONS

U.S. patent application No.: 09/070,466, filed Apr. 30, 1998 & entitled "Digital Base–Band Receiver".

* cited by examiner

Primary Examiner—Mohammad H. Ghayour
(74) Attorney, Agent, or Firm—Ladas & Parry (57) ABSTRACT

A method for determining a measure of the length of a link between a transmitter and a receiver within a communication network, including: conveying signals from the transmitter to the receiver in accordance with normal network operation, and then processing the received signals to determine the measure of the length, responsive to a length-dependent effect of the link on the signals. The method may be performed without removing the link from the network.

25 Claims, 5 Drawing Sheets

LOCAL AREA NETWORK DIAGNOSIS

FIELD OF THE INVENTION

The present invention relates generally to measuring performance of networks, and specifically to measuring the performance of links within a local area network.

BACKGROUND OF THE INVENTION

As customer requirements for rates of data delivery over Local Area Networks (LANs) increase, network installers and maintainers are increasing the rates at which data is transferred. Links in such networks commonly comprise cables and associated connectors within the network. Older cables and connectors, which may have been installed to handle 1 MHz or 10 MHz frequencies, are required to cope with 100 MHz or even 1 GHz. As frequencies are increased, signal degradation increases significantly due to, amongst other causes, frequency-dependent attenuation. Signal processing techniques are available to correct for such degradation, at least in part.

At higher frequencies, cable maintenance and diagnosis of problems, whether of older cables or of cables specifically installed for these higher frequencies, becomes significantly more demanding. Telecommunications Systems Bulletin 67 (TSB-67), issued by the Electronics Industry Association (EIA) of Washington, D.C., and the Telecommunications Industry Association (TIA) of Arlington, Va., specifies requirements that are to be met for category-5 cables used within a LAN operating under one of the Ethernet 100BASE standards. Some of the category-5 cable types covered in TSB-67 are: unshielded twisted pair (UTP), shielded twisted pair (STP), screened twisted pair (SCTP), and foiled twisted pair (FTP). TSB-67 specifies that amongst the parameters that are to be measured in determining compliance with the requirements are the physical length and the attenuation of each cable within the LAN.

Each particular type of cable has a nominal attenuation, also termed a nominal insertion loss, in dB/100 m. The nominal attenuation of UTP category-5 cable in dB/100 m is given by the equation:

$$\text{Nominal Attenuation} = 2.1 \cdot f^{0.529} + \frac{0.4}{f} \quad [\text{dB}/100 \text{ m}]$$

wherein f is the frequency in MHz. For example, the nominal attenuation of UTP category-5 cable at 100 MHz is 24 dB/100 m.

In addition to the nominal attenuation of the cable, in practice there are also "flat" (frequency-independent) attenuations caused by, for example, connectors or an electrical interface to the cable. Other fixed attenuations are frequency-dependent, such as are caused by magnetics (transformers) feeding the cable.

An approximate effective length ($L_E$) of a specific cable may be defined as:

$$L_E = \frac{\text{Actual attenuation [dB]} - \text{Fixed attenuation [dB]}}{\text{Nominal cable attenuation [dB/100 m]}} \cdot 100 \text{ m} \quad (1)$$

In practice, the effective length of a cable is a more useful measure than the physical length, since the effective length incorporates the actual cable attenuation in the measurement, and so gives a better measurement of the quality of the connection formed by the cable. When a link is formed by more than one cable, the effective length of the link, defined by summing the effective lengths of the cables based on equation (1), is similarly a more useful measure than the physical length.

Fluke Corporation, of Everett, Washington, produces a set of meters called a DSP-2000 for measuring parameters of LAN cables. Wavetek Corporation, of San Diego, Calif., produces a similar set of meters, called an LT-8000. Both sets of meters are operated in substantially the same manner. A cable to be tested is removed from the network, e.g., by disconnecting one end of the cable at a cable closet and by disconnecting the other end of the cable at a user's work station. One of the meters in the set is connected to one end of the cable, and the other meter in the set is connected to the other end of the cable. An alternative method of measurement connects one meter to an end of the cable, and disconnects the other end of the cable, leaving it as an open circuit. The length of the cable is measured by finding the time taken for a pulse to travel along the cable using a direct path when two meters are used, or a reflected path when one meter is used. The cable length is found assuming a velocity of propagation for the pulse based on nominal physical properties of the type of cable used.

Use of such meters involves disruption to the network, as each cable is disconnected then reconnected. Furthermore, apart from the time taken by the meters to test each cable, the time taken for the physical disconnection and reconnection can be considerable, especially for a medium- to large-size LAN comprising many hundreds or even thousands of cables. Measurements made on the cables while they are disconnected from the network do not necessarily provide a good measure of the performance of a link formed by one or more of the measured cables. For example, reconnecting the cable(s) back into the network to re-form the link may create one or more poor connections, so that signal degradation over the link is higher than would be expected from the cable measurements.

SUMMRY OF THE INVENTION

It is an object of the present invention to provide methods and apparatus for measuring an aspect of the performance of a link within a network without the necessity of removing the link from the network. Preferably, the aspect that is measured comprises an effective length of the link.

It is a further object of some aspects of the present invention to provide methods and apparatus for measuring the performance of a link within a local area network while the link is transmitting data.

It is a yet further object of some aspects of the present invention to provide methods and apparatus for locally or centrally measuring the performance of a link within a local area network.

In preferred embodiments of the present invention, a network, preferably a local-area network (LAN), comprises a link terminated at a first end by a data signal transmitter and at a second end by a data signal receiver. The receiver processes signals received from the transmitter in order to improve recovery of the signals from degradation due to transmission over the link. Coefficients generated by the receiver in order to perform the processing are used by a link length estimator (LLE) within the network to calculate an effective length of the link providing the signals. The effective length (as explained above in the Background of the Invention) is a measure of the attenuation generated within the link. For a link attenuating at the nominal attenuation of the link, the effective length is equal to the physical length of the link.

In some preferred embodiments of the present invention, the receiver processes the signals using an adaptive equalization technique, whereby equalization coefficients in a filter of a receiver, most preferably comprising a forward equalizer and a decision feedback equalizer, are adaptively set in order to optimize recovery of the received signals. The equalization coefficients thus determined are used by the LLE to determine the effective link length. U.S. patent application Ser. No. 09/070,466, which is assigned to the assignee of the present invention and which is incorporated herein by reference, describes a filter which uses such a technique.

Thus, the effective length of the link (and the physical length if so desired) may be measured without disconnecting the link from the network and without disruption of network operation, unlike methods known in the art which disconnect the link and so disrupt network operation. Furthermore, since the link is not disassembled while measurements are made, there is no possibility of introducing problems into the network on reassembly of the link. Measuring the performance of a network, by measuring effective lengths of links within the network without removing the links, significantly speeds up maintenance and diagnosis of problems of networks, compared to maintenance and diagnosis methods known in the art. Furthermore, effective length measurements may be made and tracked over time, without disturbing network operation, in order to detect network problems earlier and with improved precision, and thus to minimize network faults and down-time.

In some preferred embodiments of the present invention, the LAN comprises a plurality of workstations connected to one or more hubs of the network, as is known in the art. Each hub comprises a plurality of receivers and at least one LLE, which LLE measures an effective length of the link to which each receiver is connected, preferably by polling the coefficients of each receiver and calculating the effective lengths of the respective links in turn. Preferably, one of the workstations in the network is used as a network administrator station, and the station is able to read each effective length calculated by each LLE, and thus form a picture of the state of links within the network.

In an alternative preferred embodiment of the present invention, each of the workstations within the LAN comprises a receiver containing an LLE. Each LLE makes a measurement of an effective length of the link to which it is connected, and the measured effective length is read by the workstation containing the LLE. Thus each workstation is able to check the state of the link connecting the workstation into the LAN.

There is therefore provided, in accordance with a preferred embodiment of the present invention, a method for determining a measure of the length of a link between a transmitter and a receiver within a communication network, including:

conveying signals from the transmitter to the receiver in accordance with normal network operation; and processing the received signals to determine the measure of the length, responsive to a length-dependent effect of the link on the signals.

Preferably, processing the signals includes generating filter coefficients, wherein the signal is filtered using the coefficients so as to compensate for degradation of the signal due to the link length, and computing the measure based on the coefficients.

Preferably, generating the filter coefficients includes generating coefficients for adaptive equalization of the signal.

Preferably, generating the filter coefficients includes using a process of forward equalization to generate the coefficients.

Preferably, processing the received signals includes finding a solution of one or more parametric equations having the one or more filter coefficients as parameters of the one or more equations.

Alternatively, finding the solution includes transforming a function of the coefficients to the frequency domain.

Further alternatively, processing the received signals includes utilizing a substantially linear portion of the solution of the one or more parametric equations and one or more predetermined empirical constants dependent on a property of the link in order to determine the measure.

Preferably, processing the received signals includes polling the one or more filter coefficients substantially without interfering with the communication network.

Preferably, processing the received signals includes receiving the signals in a central unit of the network.

Preferably, processing the received signals includes receiving the signals in a workstation coupled to the network and reading the measure of the length of the link in the workstation.

Alternatively, the measure of the length of the link includes an effective length of the link, which is a generally linear function of a physical length of the link.

Further alternatively, the effective length is determined by comparing an actual attenuation of the link to a nominal attenuation of the link.

Preferably, conveying signals includes transmitting the signals according to an Ethernet 1OOBASE standard.

Preferably, processing the received signals includes calculating an actual attenuation of the cable.

Preferably, the measure of the length is determined substantially without disconnecting any network link.

There is further provided, in accordance with a preferred embodiment of the present invention, apparatus for determining a measure of the length of a link within a communication network, including:

a receiver, which receives signals conveyed from a transmitter in the network in the course of normal network operation; and an estimator which processes the received signals to determine the measure of the length, responsive to a length-dependent effect of the link on the signals.

Preferably, the receiver includes a filter, which generates coefficients and filters the signal using the coefficients so as to compensate for degradation of the signal due to the link length, and wherein the estimator computes the measure based on the coefficients.

Preferably, the coefficients include adaptive equalization coefficients.

Alternatively, the adaptive equalization coefficients include forward equalization coefficients.

Preferably, the estimator includes a processor which processes the received signals by finding a solution of one or more parametric equations having the one or more filter coefficients as parameters of the one or more equations.

Alternatively, the processor processes the received signals by utilizing a substantially linear portion of the solution of the one or more parametric equations and a plurality of predetermined empirical constants dependent on a property of the link.

Preferably, the estimator polls the one or more filter coefficients substantially without interfering with the communication network.

Preferably, the network includes a central unit which comprises the estimator and the receiver.

Preferably, the measure of the length of the link is read from the central unit via a network administrator station.

Preferably, the network includes a workstation which includes the estimator and the receiver and wherein the measure of the length of the link is read by the workstation.

Alternatively, the measure of the length of the link includes an effective length of the link, which is a generally linear function of a physical length of the link.

Further alternatively, the effective length is determined by comparing an actual attenuation of the link to a nominal attenuation of the link.

Preferably, the signals are conveyed according to an Ethernet 100BASE standard.

Preferably, the estimator calculates an actual attenuation of the cable.

The present invention will be more fully understood from the following detailed description of the preferred embodiments thereof, taken together with the drawings, in which:

DETAILED DESCRIPTION OF PREFERRED EMBODIMENTS

Figure 1:
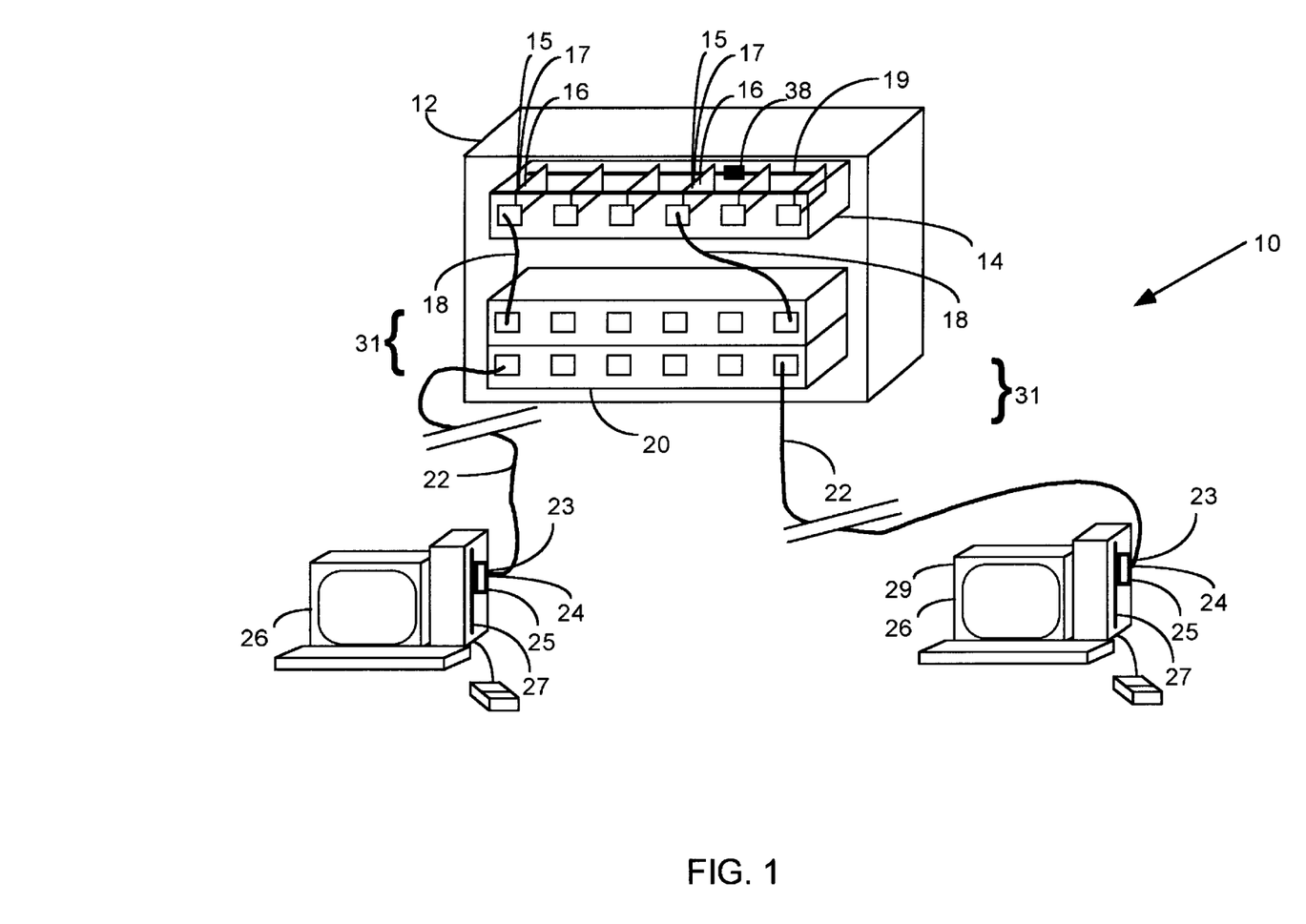
FIG. 1 is a schematic illustration of a Local Area Network (LAN), according to a preferred embodiment of the present invention.

Reference is now made to FIG. 1, which is a schematic illustration of a Local Area Network (LAN) 10, according to a preferred embodiment of the present invention. Preferably, LAN 10 operates on a high-frequency standard, such as Ethernet 100BASE-TX. A cabinet 12 contains a LAN hub 14 acting as a central unit, which hub is installed in a star configuration within LAN 10, as is known in the art. Hub 14 comprises a plurality of communication transceivers 16, each of which acts as a receiver 15 and as a transmitter 17. Preferably, each transceiver 16 is contained on a separate printed circuit card, which is coupled to a data bus 19 within hub 14, by methods known in the art. Alternatively, each transceiver 16 is implemented in a single custom integrated circuit chip. Further alternatively, the plurality of transceivers is implemented as a single printed circuit card.

LAN 10 comprises a plurality of workstations 26, which are able to communicate with each other via hub 14. Each workstation 26 comprises a communication transceiver 24, preferably as a printed circuit card coupled to a data bus 27 of workstation 26. Each workstation 26 further comprises a central processing unit (CPU) 28, which controls the operation of the workstation.

Transceiver 24 comprises a receiver portion 23 and a transmitter portion 25, as is known in the art, operating in conformity with the standard under which the network is functioning. Each transceiver 24 is connected to cabinet 12 by a cable 22. Typically, each transceiver 24 comprises magnetic components, i.e., transformers, which interface with cable 22. Preferably, each cable 22 is routed from its respective transceiver 24 to a central cable distributor 20 within cabinet 12. A plurality of patch cables 18 are connected between distributor 20 and hub 14. Thus each transceiver 24 is linked by one or more patch cables 18 in series with its respective cable 22, herein collectively termed a link 31, to a respective transceiver 16 in hub 14.

Figure 2:
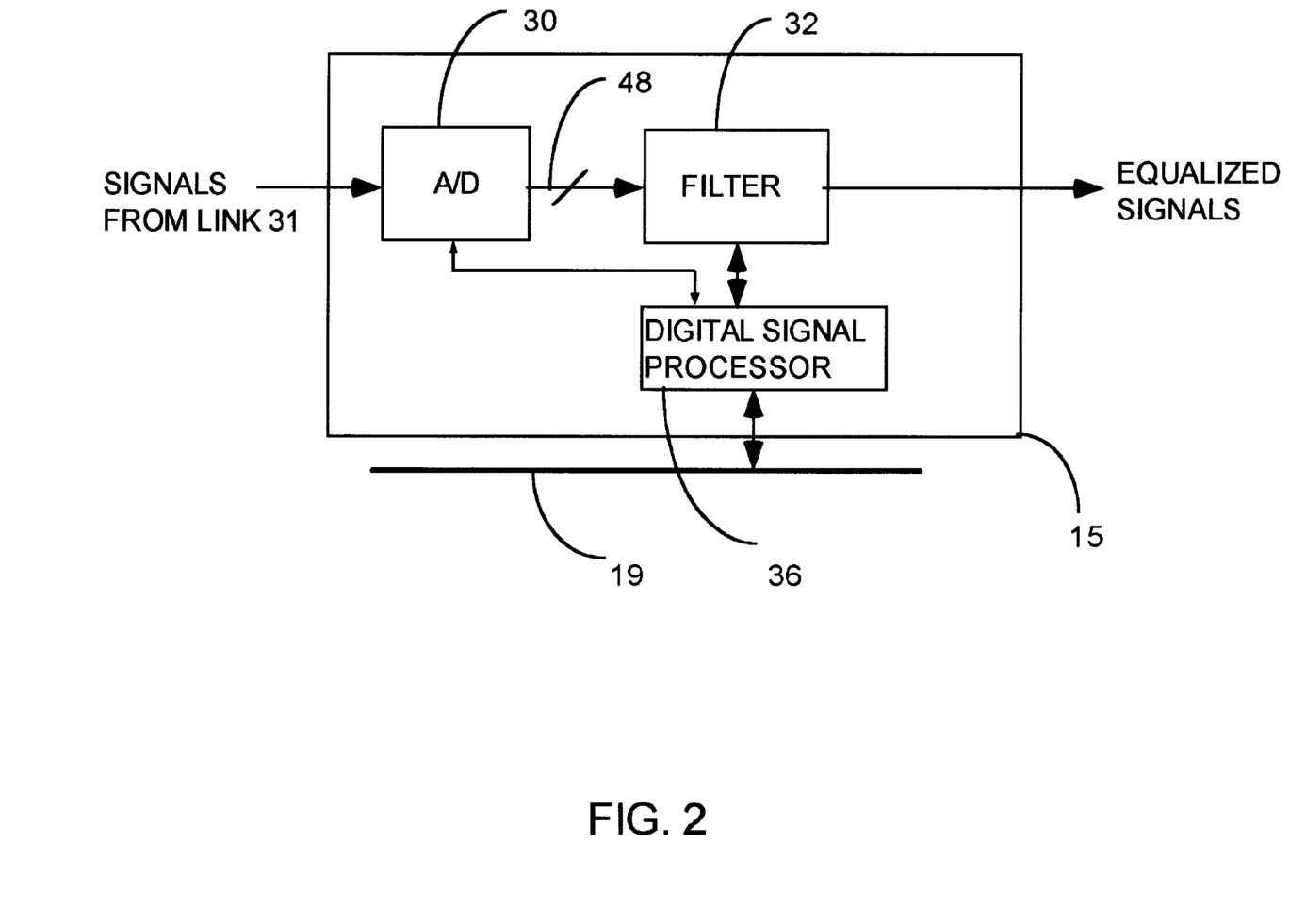
FIG. 2 is a schematic block diagram of a receiver in the LAN of FIG. 1, according to a preferred embodiment of the present invention.

FIG. 2 is a schematic block diagram of receiver 15, according to a preferred embodiment of the present invention. Receiver 15 is preferably implemented in a single custom integrated circuit chip, although discrete components or a combination of discrete and custom or semi-custom components may be used. Receiver 15 receives signals, generated according to the Ethernet 100BASE-TX standard by one of the plurality of transmitters 25, via link 31 connecting the transmitter and receiver, and digitizes the signals in an A/D converter 30. Preferably, A/D converter 30 is a six-bit converter, and the digitized value is output on a bus 48, which is preferably six bits wide. Alternatively, converter 30 comprises any other n-bit A/D converter known in the art, and the value is output on n lines.

The digitized signals are equalized by a filter 32, which adaptively generates a plurality of equalization coefficients. The equalization coefficients multiply successive sample values of the received signal in a multi-tap filter, and the multiplied values are then summed to form equalized signals, as is known in the art. The coefficients typically include both forward coefficients and feedback coefficients. The operation of filter 32 is described in detail hereinbelow, as well as in the above-mentioned U.S. patent application Ser. No. 09/070,466.

Preferably, the operation of A/D converter 30 and filter 32 is controlled by a digital signal processor (DSP) 36, which is coupled to data bus 19. Receiver 15 performs other functions known in the art, which are not illustrated in the figure for the sake of simplicity, such as amplification, limiting, and filtering of signals. These functions may be implemented entirely separately from the operations of converter 30, filter 32, and processor 36, or combined with one or more of these elements.

Figure 3:
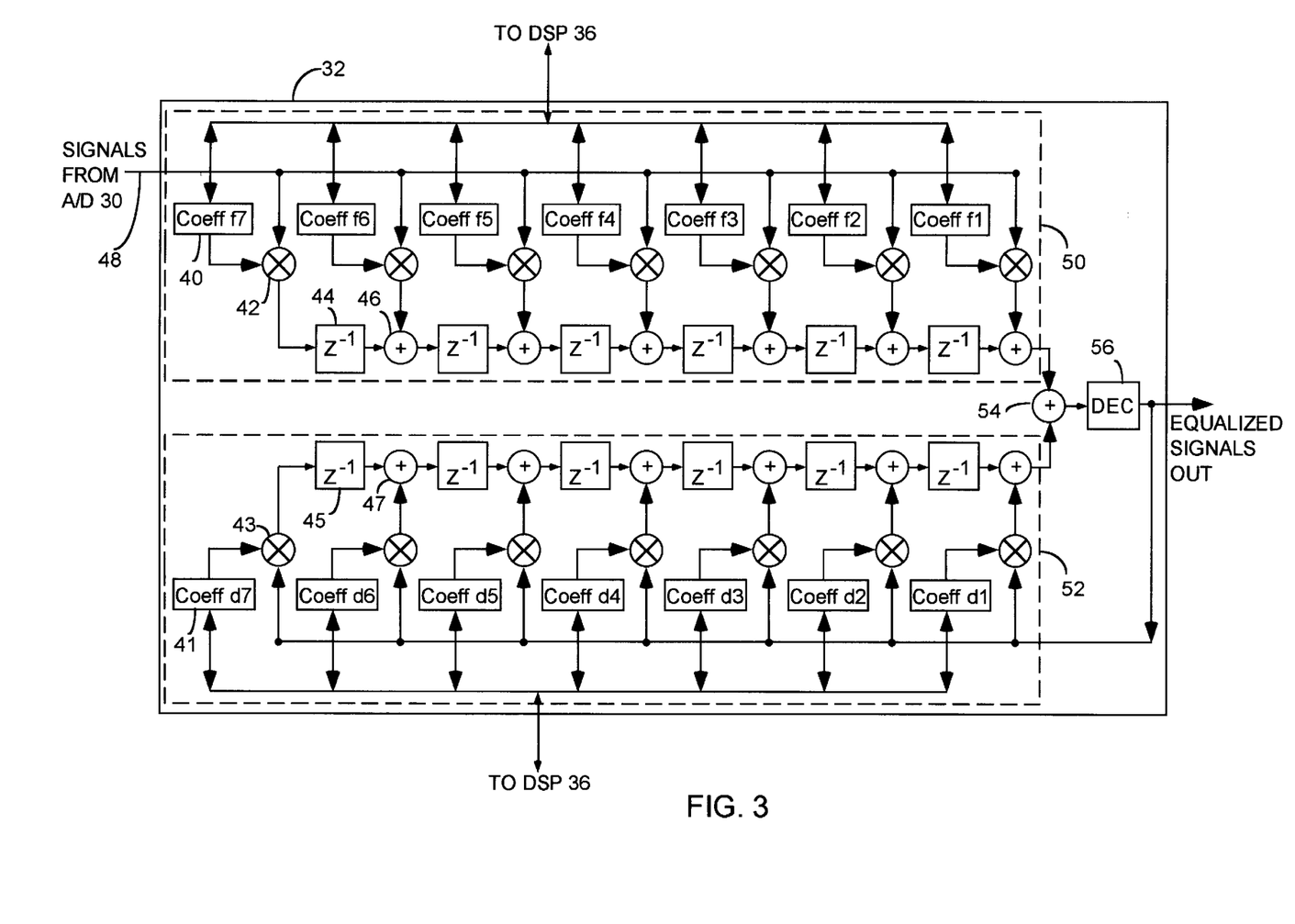
FIG. 3 is a schematic block diagram of an adaptive filter comprised in the receiver of FIG. 2, in accordance with a preferred embodiment of the present invention.

FIG. 3 is a schematic block diagram of filter 32, in accordance with a preferred embodiment of the present invention. Filter 32 comprises a plurality of forward equalization (FEQ) coefficient registers 40, holding adaptively-variable coefficients "Coeff f1", "Coeff f2", . . . , through "Coeff f7"; a plurality of FEQ coefficient multipliers 42; a plurality of single clock delays 44; and a plurality of adders 46. Registers 40, multipliers 42, delays 44, and adders 46 comprise an FEQ section 50 of filter 32, as is known in the art. Filter 32 further comprises a plurality of decision feedback equalization (DFE) registers 41, holding adaptively-variable coefficients "Coeff d1", "Coeff d2", . . . , through "Coeff d7"; a plurality of DFE coefficient multipliers 43; a plurality of single clock delays 45; and a plurality of adders 47. Registers 41, multipliers 43, delays 45, and adders 47 comprise a DFE section of filter 32.

Thus filter 32 comprises seven forward equalization taps and seven feedback taps, although the filter could be constructed from any convenient integral number of forward equalization taps and any convenient integral number of feedback taps. Considerations regarding the design of filter 32 and the determination of the coefficients stored in registers 40 and 41 are described in detail in above-mentioned U.S. patent application Ser. No. 09/070,466. Registers 40 and registers 41, holding the values of the coefficients, are addressable by DSP 36, which is also able to place individual values of the registers on data bus 19.

Signals from forward equalizer section 50 and from decision feedback equalizer section 52 are summed in an adder 54, and the summed signals are utilized by a decision module 56 to evaluate the signals (i.e., to determine whether a given sample represents a "0" or a "1" value), as described in the above-mentioned U.S. patent application Ser. No. 09/070,466 or as is otherwise known in the art. Module 56 outputs equalized signals, which are also used as the feedback input for section 52.

Returning to FIG. 1, hub 14 further comprises a link length estimator (LLE) 38 which is coupled to bus 19 and which measures an effective length of the link to a specific receiver 15, as described hereinbelow. LLE 38 is preferably implemented in software running on a general-purpose microprocessor, which may also serve other functions in the hub. Alternatively a custom or semi-custom integrated circuit chip, or discrete components or a combination of discrete and custom or semi-custom components, may be used for this purpose. LLE 38 is able to read registers 40 and registers 41 in each receiver 15, via DSP 36 of the respective receiver, most preferably by polling the registers in each receiver 15 at a very low rate so as to prevent interference with the operation of LAN 10 or the receivers.

Preferably, one of workstations 26 is operated as a network administrator station 29, from which a network administrator can issue requests for data and receive data regarding the state of the network, including the lengths of links as estimated by LLE 38. Alternatively, at least some of the functions performed by receiver 15 or LLE 38 in determining the effective link length, as described herein, are implemented by one of CPUs 28 present in one of workstations 26. The results may then be transferred to the receiver, or to the LLE, or to administrator station 29, via LAN 10. Preferably, station 29 controls, inter alia, the operation of LLE 38 via data bus 19.

For each receiver 15, LLE 38 utilizes the plurality of FEQ coefficients "Coeff f1", "Coeff f2", . . . in registers 40, and the plurality of DFE coefficients "Coeff d1", "Coeff d2", . . . in registers 41, to generate a measure of a length of link 31 between the specific receiver and its associated transmitter. Estimator 38 uses the equalization coefficients as parameters to perform a Fast Fourier Transform (FFT), thereby generating a complex parametric function h(f):

$$h(f) = \frac{B(z)}{A(z)} = \frac{b(1) + b(2)z^{-1} + \cdots + b(n_b)z^{-n_b}}{1 + a(2)z^{-1} + \cdots + a(n_a + 1)z^{-n_a}} \quad (2)$$

In this equation, the b(j) terms are respective FEQ coefficients held in registers 40 of filter 32; the a(2) to a($n_a$+1) terms are respective DFE coefficients held in registers 41; and z represents a unit delay step in the filter. $n_b$ equals the number of FEQ registers of filter 32, and $n_a$ equals the number of DFE registers, so that in relation to the filter shown in FIG. 3, $n_b$=7 and $n_a$=7, although greater or lesser numbers of values may also be used. The calculation of h(f) can be performed using the function Freqz(B,A,1024) of the Matlab software package, provided by The Mathworks Inc., of Natick, Massachusetts. Freqz(B,A,1024) calculates the response of link 31 at 1024 discrete frequencies (using the values of the functions B(z) and A(z) defined above in equation (2)). The frequencies are equal to 0, 1/1024, 2/1024, . . . , 1022/1024, 1023/1024 times a fixed frequency, which preferably corresponds to half a nominal sampling frequency of 125 MHz.

h(f) thus determined is a function of the actual attenuation of cable 22 connected to receiver 15. The exact attenuation cannot be determined using measurements made at one end of the cable only, since in this case an exact value of the transmit level is not known. However, a slope of a frequency response transfer function generated from h(f), described in detail hereinbelow, can be used to make a good estimate of the effective cable length, which is a function of the actual attenuation, as given by equation (1).

From h(f), LLE 38 generates a real-valued parametric transfer function H(f):

$$H(f) = 20 \cdot \log_{10}(|h|) \quad (3)$$

LLE 38 uses values of H(f) to evaluate the effective length of link 31, as described hereinbelow with reference to FIGS. 4 and 5.

Figure 4:
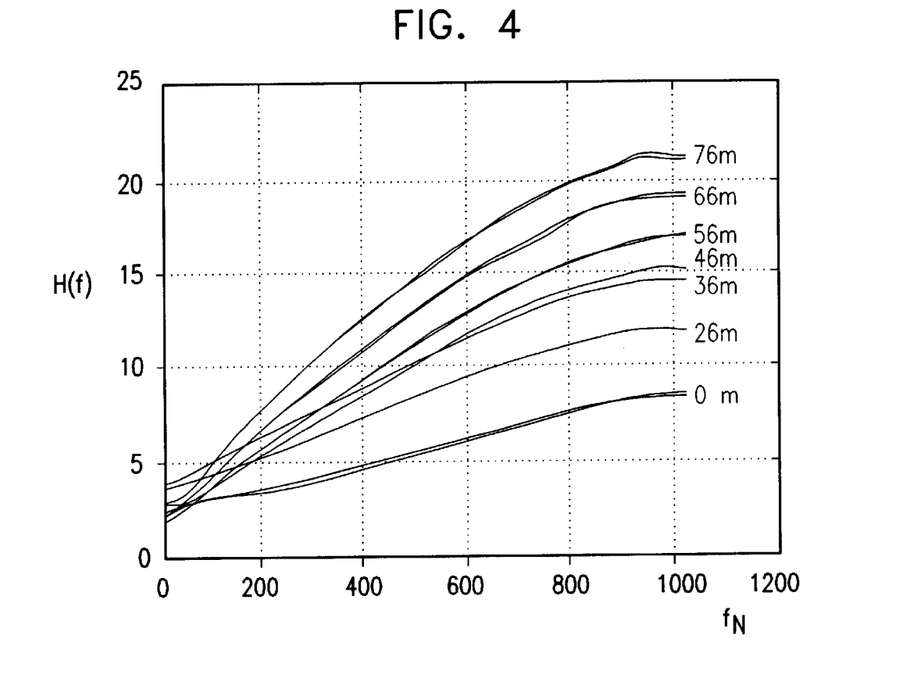
FIG. 4 is a schematic graph of a real-valued transfer function H(f) vs. normalized values of frequency f ($f_N$) for links of four different length in the LAN of FIG. 1, according to a preferred embodiment of the present invention.

FIG. 4 is a schematic graph of values of H(f) vs. normalized values of frequency f ($f_N$) for four links comprising four different physical lengths of cable 22 each coupled to a 6 m patch cable 18, according to a preferred embodiment of the present invention. Cable 22 is a category-5 type cable. For convenience, the frequency is normalized so that 1024 corresponds to 62.5 MHz, although any other linear normalization may be used. Alternatively, the graph of H(f) vs. f may be used, wherein f is not normalized. The lengths of cable 22 are 60 m, 80 m, 100 m, and 130 m, so that the total physical lengths of the links, including the 6 m patch cable, are 66 m, 86 m, 106 m, and 136 m respectively.

Below about 6 MHz and above about 43 MHz, the attenuation of data transmission is dependent on magnetics characteristics of terminations of the cable. However, in a normalized frequency range of $f_N$ from approximately 100 to approximately 700, corresponding to frequencies between 6.1 MHz and 42.7 MHz, in which range data transmission is well characterized in the Ethernet standard, the graphs are substantially linear.

Each of the graphs may be characterized by a differential of the transfer function H(f), $\Delta H_{LP}$, measured between the values of $f_N$ corresponding to 6.1 MHz and 42.7 MHz, for a respective link of physical length $L_P$. Thus, $\Delta H_{LP}$ is a measure of the slope of the respective graph. For 100 m of category-5 cable, for example, $\Delta H_{LP}$=9.7 dB. The transfer functions of the magnetics in the receiver and transmitter add about 1.3 dB to the value of $\Delta H_{LP}$.

Experimentally, after making the fixed allowance of 1.3 dB caused by the magnetics interface, which allowance is independent of the cable length, it is found that the transfer differential $\Delta H_{LP}$ is a substantially linear function of the effective length $L_E$ of the link (as defined by equation (1) in the Background of the Invention). Thus a general equation for the effective length $L_E$ of link 31 is given by:

$$L_E = K_1 \Delta H_{LP} + K_2 \quad (4)$$

wherein $K_1$, and $K_2$ are empirical constants whose values are only dependent on the type(s) of cable used for link 31. For example, when link 31 is a category-5 cable operating under the 100BASE-TX standard, $K_1$=13.3, and $K_2$=−46.7, which values are found by making measurements of attenuation on cables of known length and type and plotting graphs similar to FIG. 4. As will be apparent to those skilled in the art, values of $K_1$ and $K_2$ for other types of cables operating under the same or under a different standard, may be found by making similar measurements for those cables.

Table 1 below shows the physical length $L_P$ of link 31 and the corresponding effective length $L_E$, as calculated by equation (4), for the graphs of FIG. 4. The lengths are in meters.

TABLE 1

| Physical Length Lp | Effective Length $L_E$ from Equation (4) |
|---|---|
| 136 | 140 |
| 106 | 104 |
| 86 | 93 |
| 66 | 65 |

It will be observed from Table 1 that the physical length $L_P$ and the calculated effective length $L_E$ of the links are substantially the same.

Table 1 further illustrates that if the link being measured is largely a category-5 type cable, the effective length of the link may be accurately measured by using the equalization coefficients generated in the receiver of the link. Thus, in contrast to present methods known in the art for measuring cable parameters, cables comprising links need not be disconnected from the network, and the effective length of the link may be measured during normal operation of the link. Furthermore, as described in more detail below, since the value of the effective length of each link to a respective receiver may be placed on bus 19 of hub 14, remote measurements of a link's effective length may be made in this manner, e.g., by the network administrator. Thus, the network administrator is able to measure the effective length of every link in LAN 10 remotely, without interruption to the network operation.

Figure 5:
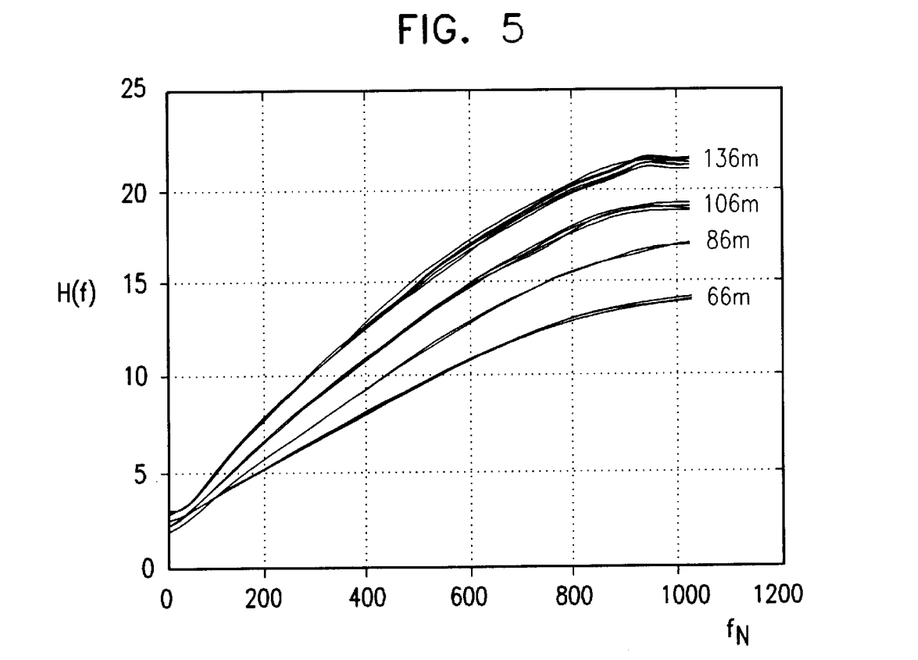
FIG. 5 is a schematic graph of H(f) vs. $f_N$ for links of seven different length in the LAN of FIG. 1, according to a preferred embodiment of the present invention.

FIG. 5 is a schematic graph of values of H(f) vs. normalized values of frequency f ($f_N$) for seven different physical lengths of cable 22, each coupled to a 6 m patch cable 18, according to a preferred embodiment of the present invention. Cable 22 is a cable having substantially similar properties to patch cable 18; specifically, the attenuation of cable 22 and cable 18 is substantially larger than the attenuation of category-5 cable. The lengths of cable 22 are 0 m, 20 m, 30 m, 40 m, 50 m, 60 m, and 70 m, so that the total physical lengths of the combined link, including the 6 m patch cable, are 6 m, 26 m, 36 m, 46 m, 56 m, 66 m, and 76 m respectively.

Measuring the respective transfer differentials $\Delta H_{LP}$ of the graphs in the linear region of the graphs, i.e., between the normalized frequencies of 100 and 700, and using these transfer differentials to calculate an effective length of the combined link from equation (4), gives the results shown in Table 2 below.

TABLE 2

| Physical Length Lp | Effective Length $L_E$ from Equation (4) |
|---|---|
| 76 | 132 |
| 66 | 113 |
| 56 | 97 |
| 46 | 76 |
| 36 | 56 |
| 26 | 34 |
| 6 | 5 |

Performing a linear regression analysis on the values in Table 2 gives $$L_P \, 0.536 \, L_E + 5.3 \qquad (5)$$

with a regression coefficient R equal to 0.9965, showing that the relationship between $L_P$ and $L_E$ is strongly linear.

The values for the effective length in Table 2 are calculated assuming the link to be principally formed from category-5 type cable, whereas, as stated above, the links are formed from cable with higher attenuation than that of category-5 cable. The higher attenuation is reflected in the increased effective lengths compared to the respective physical lengths found for the links. Equation (5) may be used to calculate the physical length of the link if desired. Alternatively, the physical length may be found from the effective length by using a nominal attenuation of actual cables in the link. Preferably, the effective length is used since it, and not the physical length, predicts the quality of the link, as explained in the Background of the Invention. Table 2 illustrates that if the cable forming the link being measured does not have the properties of a category-5 cable, the effective length can be substantially greater than the physical length.

Returning to FIG. 1, LLE 38 performs calculations as described above with reference to FIG. 4 and FIG. 5. LLE 38 calculates values of H(f) as defined by equation (3), in order to evaluate the effective length of a specific link 31 connected to a specific receiver 15, and places the value on data bus 19. Thus, station 29 can request the effective length of each cable link 31 as calculated in each receiver 15 in LAN 10, and so can form a complete picture of the state of the network without disruption of the network.

Figure 6:
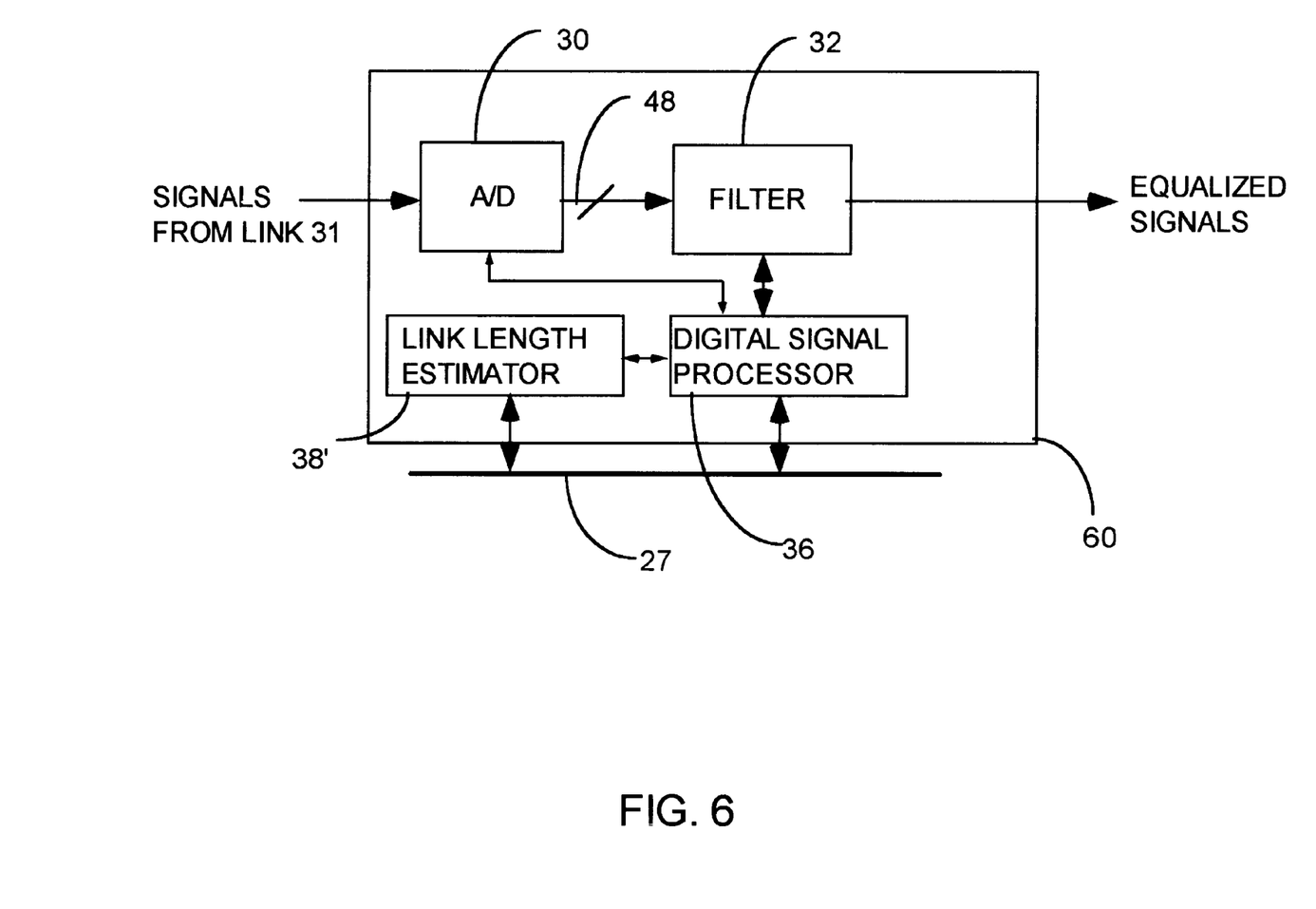
FIG. 6 is a schematic block diagram of a receiver in the LAN of FIG. 1, according to an alternative preferred embodiment of the present invention.

FIG. 6 is a schematic block diagram of a receiver 60, according to an alternative preferred embodiment of the present invention. Receiver 60 operates in a manner substantially similar to receiver 15, whereby elements with the same numerals in receivers 15 and 60 are substantially similar in operation and construction, except for the differences described hereinbelow. Receiver 60 is installed in place of receiver 23 in one of workstations 26, and communicates with data bus 27 of the workstation. Receiver 60 comprises an LLE 38', which is substantially similar in operation to LLE 38, and which preferably is able to communicate directly with DSP 36 of the receiver, in order to read values of coefficient registers of filter 32 of the receiver.

LLE 38' of receiver 60 calculates the value of the effective length of link 31 (connecting the workstation containing receiver 60 to hub 14) by utilizing coefficients of filter 32, by methods described above with reference to LLE 38. LLE 38' places the value on data bus 27 of the workstation, so that an operator of the workstation is able to read the effective length of the link connecting hub 14 to the workstation, and so to check the state of the workstation's link to the network. Alternatively, LLE 38' calculates the physical length of link 31 as described above, which physical value is read by the operator of the workstation. Further alternatively, at least some of the functions performed by receiver 60 or LLE 38' in determining the effective link length of link 31 are implemented by CPU 28 present in workstation 26. It will be appreciated that LLE 38' operates independently of LLE 38, so that LLE 38 need not be present in hub 14 in this embodiment.

Although in some of the preferred embodiments described hereinabove, it has been assumed that there is apparatus containing a link length estimator at one end of a link, it will be appreciated that apparatus with estimators may be placed at both ends of a link, so that an effective length measurement may be made from each end of the link. For example, for a category-5 twisted pair cable having an estimator at each end, each estimator can make a direct measurement on a different pair of wires. Thus, having an estimator at each end of the cable enables direct detection of a problem that may exist in one pair only.

Furthermore, in place of the adaptive filter described above, other signal reception and correction devices may be used, preferably adaptively, to generate coefficients for use in measuring the effective length of the link, in accordance with the principles of the present invention. For example, a received amplitude of a signal may be directly or indirectly measured at one or more specific frequencies, and the received amplitude compared with a transmitted amplitude of the signal. All such alternative embodiments are considered to be within the scope of the present invention.

It will thus be understood that the preferred embodiments described above are cited by way of example, and the full scope of the invention is limited only by the claims.

What is claimed is:

1. A method for determining a measure of the length of a link between a transmitter and a receiver within a communication network, comprising:

conveying signals from the transmitter to the receiver in accordance with normal network operation; and processing the received signals to determine the measure of the length, responsive to a length-dependent effect of the link on the signals, wherein processing the signals comprises generating filter coefficients, wherein the signal is filtered using the coefficients so as to compensate for degradation of the signal due to the link length, and computing the measure based on the coefficients, wherein processing the received signals comprises finding a solution of one or more parametric equations having the one or more filter coefficients as parameters of the one or more equations, and wherein finding the solution comprises transforming a function of the coefficients to the frequency domain.

2. A method for determining a measure of the length of a link between a transmitter and a receiver within a communication network, comprising:

conveying signals from the transmitter to the receiver in accordance with normal network operation; and processing the received signals to determine the measure of the length, responsive to a length-dependent effect of the link on the signals, wherein processing the signals comprises generating filter coefficients, wherein the signal is filtered using the coefficients so as to compensate for degradation of the signal due to the link length, and computing the measure based on the coefficients, wherein processing the received signals comprises finding a solution of one or more parametric equations having the one or more filter coefficients as parameters of the one or more equations, and wherein processing the received signals comprises utilizing a substantially linear portion of the solution of the one or more parametric equations and one or more predetermined empirical constants dependent on a property of the link in order to determine the measure.

3. A method for determining a measure of the length of a link between a transmitter and a receiver within a communication network, comprising:

conveying signals from the transmitter to the receiver in accordance with normal network operation; and processing the received signals to determine the measure of the length, responsive to a length-dependent effect of the link on the signals, wherein processing the signals comprises generating filter coefficients, wherein the signal is filtered using the coefficients so as to compensate for degradation of the signal due to the link length, and computing the measure based on the coefficients, and wherein processing the received signals comprises polling the one or more filter coefficients substantially without interfering with the communication network.

4. A method according to claim 3, wherein generating the filter coefficients comprises generating coefficients for adaptive equalization of the signal.

5. A method according to claim 3, wherein generating the filter coefficients comprises using a process of forward equalization to generate the coefficients.

6. A method according to claim 3, wherein processing the received signals comprises finding a solution of one or more parametric equations having the one or more filter coefficients as parameters of the one or more equations.

7. A method according to claim 3, wherein processing the received signals comprises receiving the signals in a central unit of the network.

8. A method according to claims wherein processing the received signals comprises receiving the signals in a workstation coupled to the network and reading the measure of the length of the link in the workstation.

9. A method according to claim 3, wherein the measure of the length of the link comprises an effective length of the link, which is a generally linear function of a physical length of the link.

10. A method according to claim 9, wherein the effective length is determined by comparing an actual attenuation of the link to a normal attenuation of the link.

11. A method according to claim 3, wherein conveying signals comprises transmitting the signals according to an Ethernet 100BASE standard.

12. A method according to claim 3, wherein processing the received signals comprises calculating an actual attenuation of the cable.

13. A method according to claim 3, wherein the measure of the length is determined substantially without disconnecting any network link.

14. Apparatus for determining a measure of the length of a link within a communication network, comprising:

a receiver, which receives signals conveyed from a transmitter in the network in the course of normal network operation; and an estimator which processes the received signals to determine the measure of the length, responsive to a length-dependent effect of the link on the signals, wherein the receiver comprises a filter, which generates coefficients and filters the signal using the coefficients so as to compensate for degradation of the signal due to the link length, and wherein the estimator computes the measure based on the coefficients, wherein the estimator comprises a processor which processes the received signals by finding a solution of one or more parametric equations having the one or more filter coefficients as parameters of the one or more equations, and wherein the processor processes the received signals by utilizing a substantially linear portion of the solution of the one or more parametric equations and a plurality of predetermined empirical constants dependent on a property of the link.

15. Apparatus for determining a measure of the length of a link within a communication network, comprising:

a receiver, which receives signals conveyed from a transmitter in the network in the course of normal network operation; and an estimator which processes the received signals to determine the measure of the length, responsive to a length-dependent effect of the link on the signals, wherein the receiver comprises a filter, which generates coefficients and filters the signal using the coefficients so as to compensate for degradation of the signal due to the link length, and wherein the estimator computes the measure based on the coefficients, and wherein the estimator polls the one or more filter coefficients substantially without interfering with the communication network.

16. Apparatus according to claim 15, wherein the coefficients comprise adaptive equalization coefficients.

17. Apparatus according to claim 15, wherein the adaptive equalization coefficients comprise forward equalization coefficients.

18. Apparatus according to claim 15, wherein the estimator comprises a processor which processes the received signals by finding a solution of one or more parametric equations having the one or more filter coefficients as parameters of the one or more equations.

19. Apparatus according to claim 15, wherein the network comprises a central unit which comprises the estimator and the receiver.

20. Apparatus according to claim 19, wherein the measure of the length of the link is read from the central unit via a network administrator station.

21. Apparatus according to claim 15, wherein the network comprises a workstation which comprises the estimator and the receiver and wherein the measure of the length of the link is read by the workstation.

22. Apparatus according to claim 15, wherein the measure of the length of the link comprises an effective length of the link, which is a generally linear function of a physical length of the link.

23. Apparatus according to claim 22, wherein the effective length is determined by comparing an actual attenuation of the link to a nominal attenuation of the link.

24. Apparatus according to claim 15, wherein the signals are conveyed according to an Ethernet 100BASE standard.

25. Apparatus according to claim 15, wherein the estimator calculates an actual attenuation of the cable.

* * * * *